Jan. 9, 1951

M. S. McVAY ET AL 2,537,077

DOUBLE PULSE GENERATOR

Filed June 19, 1942

Inventors
Millard S. McVay
John H. Greig

By [signature]

Attorney

Patented Jan. 9, 1951

2,537,077

UNITED STATES PATENT OFFICE 2,537,077

DOUBLE PULSE GENERATOR

Millard S. McVay and John H. Greig,
Washington, D. C.

Application June 19, 1942, Serial No. 447,672

8 Claims. (Cl. 250—36)

(Granted under the act of March 3, 1883, as amended April 30, 1928; 370 O. G. 757)

This invention relates to impulse generators and more particularly to electrical circuits for generating double pulses.

There has been a long need in the art for an electrical impulse generator capable of generating a double pulse, upon application of a single momentary keying impulse thereto, of such design and construction that great stability is maintained during operation thereof. A generator of the foregoing type has numerous useful applications; for example, the double pulse may be utilized for accurately controlling operation of, and for calibrating various electrical devices, as well as having varied utilizations in connection with certain electrical indicating systems.

It is therefore the principal object of the present invention to provide a double pulse generator having the foregoing characteristics.

Another object is to provide an impulse generator capable of producing a double pulse output upon application of a single momentary keying impulse to the generator, of such design that the characteristics of the double pulse are independent of corresponding characteristics of the keying impulse.

Another object is to provide a double pulse generator having novel means for producing a stable time interval between application of the keying impulses and subsequent generation of the double pulses, with other means for varying such time interval.

Another object is to provide a generator for producing a double pulse, so characterized that the separation between the pulses comprising the double pulse is readily variable, and wherein a predetermined pulse separation is maintained with great stability.

Still another object of the invention is to provide a double pulse generator having a pair of normally non-oscillating oscillator circuits which are adapted to be rendered in an oscillating state, at different time intervals, to generate extremely sharp pulses.

Still another object is to provide a double pulse generator of the above type wherein one of the oscillator circuits is rendered oscillating upon application of a keying impulse to the generator, and wherein the other oscillator circuit is rendered in an oscillating state in response to the oscillations of said one oscillator circuit.

Still another object is to provide a double pulse generator of the above type wherein a linearly increasing potential is periodically applied to said one circuit upon periodic application of a keying impulse, with control means included in the circuit whereby the latter may be rendered oscillating at various instances during application of the linearly increasing potential thereto, to thus vary the time interval between application of the keying impulse and subsequent generation of the double pulse.

Still another object is to provide a generator responsive to application of a linearly increasing potential, for producing a double pulse, being of such construction to abruptly terminate application of the linearly increasing potential upon initiation of generation of the first pulse of the double pulse.

Other objects and features of the invention will appear more fully hereinafter from the following detailed description when considered in connection with the accompanying drawing which discloses one embodiment of the invention. It is to be expressly understood, however, that the drawing is designed for purposes of illustration only and not as a definition of the limits of the invention, reference for the latter purpose being had to the appended claims.

Figure 1:
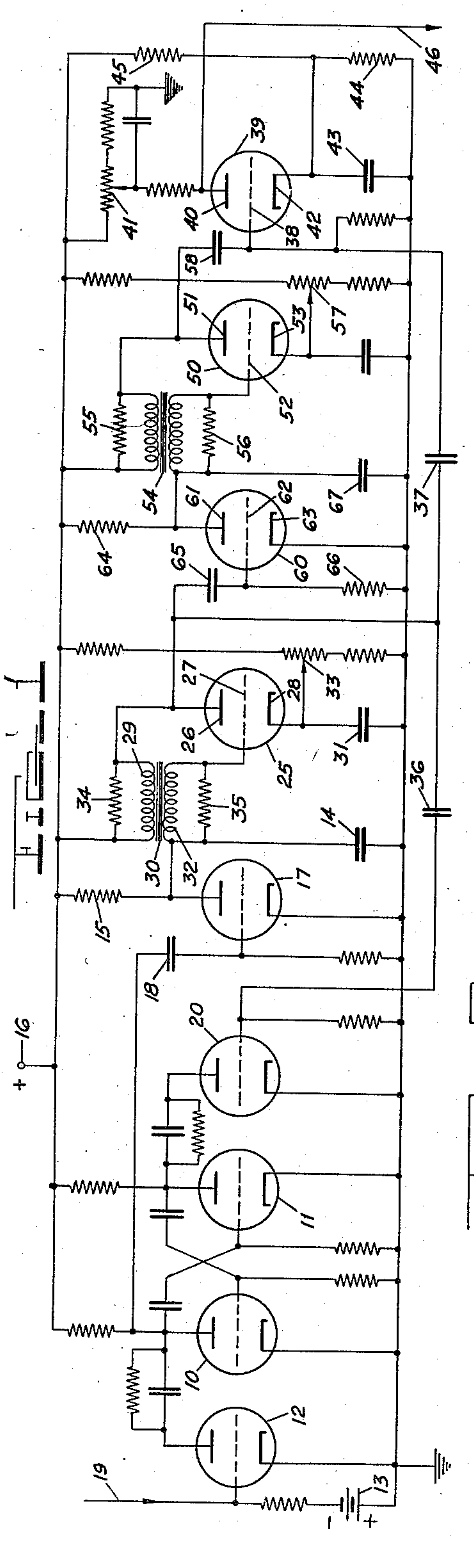
Fig. 1 is a schematic illustration of a double pulse generator embodying the principles of the present invention.

With reference more particularly to Fig. 1 of the drawing, a double pulse generator constructed in accordance with the principles of the present invention is disclosed therein including a generator for periodically producing a potential, upon application of a single momentary keying impulse thereto, which linearly increases with time, with means responsive to a time related electrical signal for terminating the linearly increasing potential to thus generate a wave form commonly referred to as a saw-tooth wave. As shown, the generator includes a multi-vibrator circuit which comprises a pair of vacuum tubes 10 and 11 having the input and output electrodes thereof interconnected to form a two-stage capacitance coupled amplifier with regenerative feedback. The control grid, or input electrode of tube 11, is connected to the output of keying tube 12, which is normally maintained non-conducting by application of a negative bias to the control grid thereof from bias supply 13. The control grid of tube 11 is therefore initially at the proper potential to maintain the latter tube conducting, and, due to the coupling of the anode of tube 11 to the grid of tube 12, to block tube 10 by maintaining the control grid thereof at negative potential. The generator further includes capacitance 14, continually supplied, through resistance 15, with a source of positive potential from point 16. A discharge circuit is associated with capacitance 14 for normally discharging the capacitance so that very little or no charge normally appears thereon. Such discharge circuit includes vacuum tube 17, the plate and cathode of which are respectively connected to the high and low terminals of capacitance 14. The control grid of tube 17 is connected, through capacitance 18, to the plate of tube 10 of the multi-vibrator circuit, to maintain tube 17 in a non-conducting state, when tube 10 of the multi-vibrator is conducting and discharge capacitance 14.

Figures 2, 3, 4, 5:
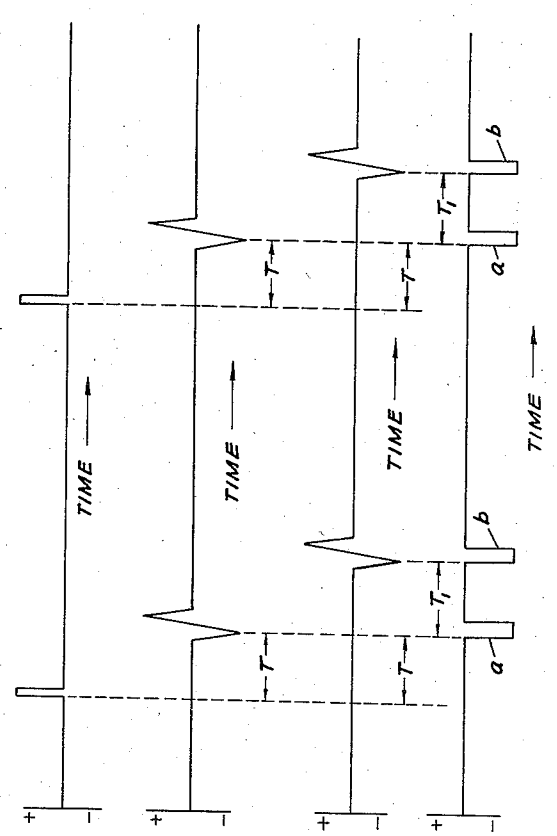
Fig. 2 is a showing of the momentary keying impulse applied at terminal 19 of Fig. 1.
Fig. 3 shows the voltage output of tube 25.
Fig. 4 shows the voltage output of tube 59.
Fig. 5 is an illustration of the double pulse output of the generator shown in Fig. 1 in time relation with the keying impulses shown in Fig. 2.

Under periodic application of a positive keying impulse, such as is shown in Fig. 2, to the control grid of tube 12 through input channel 19, tube 12 is rendered conducting responsively to the initial signal to throw the multivibrator into the second condition wherein tube 10 is passing current and tube 11 is blocked. The generator then operates to produce a potential, which essentially linearly increases with time, when tube 17 is rendered non-conducting, by allowing capacitance 14 to charge through resistance 15. At the instant tube 10 is rendered conducting, a potential drop appears at the output thereof which is applied, through capacitance 18, to the control grid of tube 17, blocking the latter tube and allowing initiation of the charging of capacitance 14. In order to terminate the substantially linear charging of capacitance 14 and thus generate a saw-tooth wave form, means are provided for abruptly changing the multi-vibrator circuit to the initial state thereof, after lapse of a predetermined period of time shorter than the recurrent period of keying impulse, to again render tube 17 conducting and to abruptly discharge capacitance 14 therethrough. For this purpose, vacuum tube 20 is provided with the output thereof connected to the control grid of tube 10. When a positive impulse is applied to the control grid of tube 20, the latter tube passes current and a negative impulse is applied to the control grid of tube 10 to reset the multi-vibrator circuit from the second state to the initial state thereof. The time constants of the multi-vibrator circuit are selected so that the circuit is abruptly varied from the second state to the initial state solely upon operation of tube 20. As will appear more fully hereinafter, the positive impulses applied to re-set tube 20 are properly synchronized with operation of the generator so that each saw-tooth wave form is generated prior to application of the next keying impulse to terminal 19. The foregoing type of saw-tooth wave generator operates with a high degree of accuracy and with great stability since the multi-vibrator circuit is employed therein. Such circuits are capable of producing extremely abrupt negative impulses, at constant potential for the duration of the pulse, which control operation of the generator in such a manner that extremely uniform saw-tooth wave forms are produced.

As previously mentioned, the novel double pulse generator provided by the present invention includes a pair of normally non-oscillating oscillator circuits, one of which is rendered oscillating, to initiate generation of a first pulse, upon application of a predetermined potential thereto. Also, as discussed heretofore, the oscillator circuit is of such construction and design that the potential value required for rendering the latter circuit in an oscillating condition may be readily varied. With the foregoing arrangement, by applying the saw-tooth wave output of the generator to the oscillating circuit, a pulse may be generated at any instant during the time of linearly increasing potential of each saw-tooth wave form. As shown in Fig. 1, the first oscillator circuit comprises a triode vacuum tube 25, having a plate 26, a control grid 27 and a cathode 28. Plate 26 is maintained at positive potential from point 16 by a connection through a winding 29 of transformer 30, while cathode 28 is maintained at positive potential and bypassed to ground potential through capacitance 31. Winding 32 of transformer 30 is connected to control grid 27 to form a grid-plate oscillator circuit which is normally maintained in a non-oscillating state since tube 25 is normally blocked by a positive bias on cathode 28. The high potential terminal of capacitance 14 is connected to control grid 27, through transformer winding 32, to control operation of tube 25, and therefore, oscillations in the grid-plate oscillator circuit. When the substantial linearly increasing charge on capacitance 14 reaches a value corresponding to the cut-off potential of tube 25, the tube is rendered conducting and oscillations commence in the oscillator circuit. Potentiometer device 33 is provided for varying the bias on cathode 28, and hence the cut-off potential of tube 25. With this arrangement, tube 25 may be rendered conducting at any desired instant during application of the linearly increasing potential from capacitance 14 by adjustment of potentiometer device 33. Resistances 34 and 35 are respectively connected across transformer windings 29 and 32 for limiting the extent of oscillations in the grid-plate oscillator circuit, for a purpose that will become apparent hereinafter.

When the substantial linearly increasing charge on capacitance 14 reaches a value corresponding to the cut-off potential of tube 25, which is determined by the position of the potentiometer device 33, tube 25 becomes conducting and a drop in potential appears at plate 26. Oscillations then occur in the grid-plate circuit to produce extremely sharp alternate negative and positive impulses at plate 26. Resistances 34 and 35 are of sufficient values to damp such oscillations, so that only a single negative and a single positive impulse are generated at the output of tube 25 for each time the tube is driven conducting, or upon each application of a linearly increasing potential to control grid 27. The negative and positive impulse from tube 25 are fed through capacitance 36 to the control grid of re-set tube 20. Since the multi-vibrator circuit is in the second state when capacitance 14 charges, tube 20 is maintained in a non-conducting state when the single negative impulse and single positive impulse are applied to the control grid thereof, so that application of the negative impulse does not effect tube 20; however, subsequent application of the positive impulse renders tube 20 conducting and abruptly resets the multi-vibrator circuit to the initial state thereof and terminates the increasing charge on capacitance 14 in a manner discussed heretofore.

The single negative and single positive impulse output of tube 25 is also applied, through capacitance 37, to control grid 38 of vacuum tube 39. Tube 39 not only functions as an amplifying device, but also as a rectifying means whereby a single impulse, of negative polarity is produced at the output thereof upon application of the negative and positive impulses to grid 38. Tube 39 includes plate 40, connected through potentiometer device 41 to the source of positive potential at point 16, and cathode 42 connected to ground potential through capacitance 43 and resistance 44. Cathode 42 is biased in such a manner, by means of resistances 44 and 45, that tube 39 is normally blocked. However, when the positive impulse is applied to control grid 38, tube 39 is rendered conducting for a period of time determined by the duration of the positive impulse, and a negative impulse is generated at output terminal 46, the latter being connected to plate 40. The amplitude of the negative pulse output at terminal 46 is readily variable upon operation of potentiometer device 41.

Means are also provided by the present invention for generating a second negative impulse at terminal 46, following generation of the first impulse as discussed above, with means establishing and maintaining a time separation between the pulses. As mentioned heretofore, a second normally non-oscillating oscillator circuit is provided for generating the second impulse in response to the output of the first oscillator circuit, with time delay means for establishing a predetermined separation between the pulses. As shown in Fig. 1, triode vacuum tube 50, having a plate 51, a control grid 52 and a cathode 53 is provided, with plate 51 and grid 52 interconnected through transformer 54 to form an oscillator circuit. Resistances 55 and 56 are connected across the windings of transformer 54 to damp oscillations within the grid-plate oscillator circuit. Tube 50 is normally blocked by a positive bias on cathode 53, determined by adjustment of potentiometer device 57. When tube 50 is rendered conducting, upon application of a positive potential to control grid 52 that corresponds to the cut-off potential of the tube, tube 50 is driven conducting and oscillations commence in the grid-plate circuit. For reasons mentioned heretofore, extremely sharp single negative and single positive impulses are generated at plate 51. Plate 51 is connected through capacitance 58 to control grid 38 of tube 39 to operate the tube in a manner discussed heretofore to generate another negative impulse at terminal 46. Oscillator circuit comprising tube 50 and transformer 54 possesses inherent characteristics similar to the corresponding characteristics of the oscillator circuit including tube 25 and transformer 30. Such an arrangement produces a double pulse output wherein the pulses comprising the double pulse are similar in magnitude and of equal duration.

In order to establish a time separation between the impulses which comprise the double pulse output at terminal 46, means are provided for producing a time delay between generation of the single negative and single positive impulses at tube 25 and generation of a similar output of tube 50. Such means, as shown in the drawing, comprises vacuum tube 60 which includes plate 61, control grid 62 and cathode 63. Plate 61 is connected to point 16 through resistance 64, and cathode 63 is directly connected to ground potential so that tube 60 normally passes current. Control grid 62 is connected to plate 26 of tube 25, through capacitance 65, and is also connected to ground potential by way of resistance 66. The time delay means further includes capacitance 67, of small capacity, with the high and low potential terminals thereof respectively connected to plate 61 and cathode 63 of tube 60. The high potential terminal of capacitance 67 is also connected through a winding of transformer 54 to control grid 52 of tube 50. When tube 60 is blocked, capacitance 67 receives a charge which is applied to control grid 52 to control operation of tube 50.

When the single negative impulse from tube 25 is applied to control grid 62 of tube 60 the tube is blocked for an extremely short period of time since the negative impulse is immediately followed by a positive impulse that again renders tube 60 conducting. During the short interval of time when tube 60 is blocked, capacitance 67 does not receive an appreciable potential increase to render tube 50 conducting. When the single positive impulse is applied to control grid 62, the control grid draws current and thereafter remains at a negative bias, to maintain tube 60 blocked for a predetermined period of time determined by the values of capacitance 65 and resistance 66. As the negative bias on grid 62 diminishes to ground potential through resistance 66, after lapse of such predetermined period of time, the control grid is driven positive to render tube 60 conducting. Tube 60 remains in a non-conducting state for a period of time to allow the charge on capacitance 67 to build up to a sufficient potential value for rendering tube 50 conducting, thus initiate generation of the second positive pulse at terminal 46. The pulses comprising the double pulse output at terminal 46 are thus separated by a time interval determined by the values of capacitance 67 and resistance 64. Potentiometer device 57 determines the cut-off potential of tube 50, and may be employed for varying the pulse separation. However, since capacitance 67 is of a small value, such that stray capacity could be employed therefor, potentiometer device 57 has very little utilization for establishing a time separation, and is primarily provided for adjusting tube 50 at the optimum cut-off potential.

Operation of the double pulse generator may be more easily understood with reference to Figs. 2 through 5 of the drawing. These figures disclose the input and output voltages of the generator, and the output voltages of the oscillator circuits, in the same time relations therebetween so that the time intervals between application of the momentary keying impulse and generation of the double pulse, as well as the time separation between the pulses comprising the double pulse may be more readily comprehended. When the momentary keying impulse, shown in Fig. 2, is applied to input terminal 19, the multi-vibrator circuit abruptly changes from the initial state thereof, wherein tube 10 is blocked and a positive potential is applied to the control grid of tube 17, to the second state, wherein tube 10 is conducting and a negative potential is applied to tube 17. When tube 17 becomes blocked, capacitance 14 commences to charge substantially linearly through resistance 15. The charge on capacitance 14 is applied to control grid 27 to render tube 25 conducting when the charge on capacitance corresponds to the cut-off potential of tube 25, which is determined by adjustment of potentiometer device 33. When tube 25 is rendered conducting, a single negative and a single positive impulse is produced at the output thereof, as shown in Fig. 3. The time interval T, between application of the momentary keying impulse and generation of the single negative impulse at tube 25 is determined by adjustment of potentiometer device 33. The output of tube 25 is passed to tube 20 to re-set the multi-vibrator circuit to the initial state thereof, and to thus terminate the substantial linearly increasing charge on capacitance 14. The single negative and single positive impulses from tube 25 are fed to control grid 38 of amplifier tube 39 whereby a negative impulse is produced at terminal 46, as shown by pulse *a* in Fig. 5. As shown in the latter figure, pulse *a* lags application of the keying impulse of Fig. 2 by the time interval T.

The second negative impulse at terminal 46 is generated in the following manner. The single negative and single positive impulse output of tube 25 is fed to delay tube 60, which is blocked for a predetermined time determined by the values of capacitance 65 and resistance 66. When tube 60 is blocked, capacitance 67 charges through resistance 64 and renders tube 50 conducting whereby a single negative and a single positive impulse is generated at plate 51, as shown in Fig. 4. The output of tube 50 lags a similar output of tube 25 by a predetermined time interval $T_1$, determined by the values of capacitance 67 and resistance 64, which may be more readily understood by simultaneous reference to Figs. 3 and 4. The output of tube 50 is passed to control grid 38 of tube 39 wherein the single positive pulse renders tube 39 conducting for a short period of time to thus generate the second negative impulse at terminal 46. The second impulse is shown in Fig. 5 and is designated by *b*. Impulses *a* and *b* are separated by time interval $T_1$ established in a manner fully discussed heretofore.

There is thus provided by the present invention a novel electrical generator capable of producing a double pulse upon application of every single momentary keying impulse thereto, of such design and construction that the characteristics of the double pulses are independent of similar characteristics of the keying impulses. Moreover, the double pulse generator disclosed herein provides means for establishing a predetermined time delay, which is readily variable, between application of the keying impulse and subsequent generation of the double pulse, as well as establishing a time separation between the pulses comprising the double pulse. The utilization of sawtooth wave forms for initiating generation of the double pulse, and the employment of oscillator circuits for initiating generating of the pulses which comprise the double pulse provides extremely stable operation and very short output pulses.

Although only one embodiment of the invention has been disclosed and described herein, it is to be expressly understood that various changes and substitutions may be made therein without departing from the spirit of the invention, as well understood by those skilled in the art. Reference therefore will be had to the appended claims as a definition of the limits of the invention.

The invention described herein may be manufactured and used by or for the Government of the United States of America for governmental purposes without the payment of any royalties thereon or therefor.

What is claimed is:

1. A double pulse generator comprising a pair of oscillator circuits, a non-conducting electron discharge device included in each circuit for maintaining said circuits in a non-oscillating condition, means applying a predetermined potential to one of said devices for rendering the latter conducting whereby one of said circuits is rendered oscillating, means responsive to the oscillations of said one circuit for rendering the other device conducting after lapse of a predetermined period of time whereby the other circuit is rendered oscillating, and means responsive to the oscillations of said circuits for producing a double pulse output wherein the pulses comprising said double pulse are separated by an interval corresponding to said predetermined period of time.

2. A double pulse generator comprising a pair of oscillator circuits, a non-conducting electron discharge device included in each circuit for maintaining said circuits in a non-oscillating condition, means applying a predetermined potential to one of said devices for rendering the latter conducting whereby one of said circuits is rendered oscillating, means responsive to the oscillations of said one circuit for rendering the other device conducting after lapse of a predetermined period of time whereby the other circuit is rendered oscillating, and means rectifying and amplifying the oscillations of said circuits whereby a double pulse is produced with the pulses comprising said double pulse separated by an interval corresponding to said predetermined period of time.

3. A double pulse generator comprising a pair of oscillator circuits, a non-conducting electron discharge device included in each circuit for maintaining said circuits in a non-oscillating state, means applying a predetermined potential to one of said devices for rendering the latter conducting whereby a pulsating output is generated at one of said circuits, means limiting the extent of oscillations of said one circuit whereby a single and negative and a single positive pulse is generated thereby, means responsive to said single negative and positive pulses for rendering the other device conducting after lapse of a predetermined period of time whereby the other circuit produces a pulsating output, and means responsive to the pulsating outputs of said circuits for generating a double pulse separated by an interval corresponding to said predetermined period of time.

4. A double pulse generator comprising a pair of oscillator circuits, a non-conducting electron discharge device included in each circuit for maintaining said circuits in a non-oscillating state, means applying a predetermined potential to one of said devices for rendering the latter conducting whereby a pulsating output is generated at one of said circuits, means limiting the extent of oscillations of said one circuit whereby a single negative and a single positive pulse is generated thereby, means responsive to said single negative and positive pulses for rendering the other device conducting after lapse of a predetermined period of time whereby the other circuit produces a pulsating output, means limiting the oscillations in said other circuit whereby a single negative and a single positive pulse is produced thereby, and a normally conducting electron discharge device responsive to application of the positive impulse outputs of said circuits for producing a double pulse separated by an interval corresponding to said predetermined period of time.

5. A double pulse generator comprising an oscillator circuit including a blocked electron discharge device, means rendering said device conducting when a potential corresponding to the cut-off potential of said device is applied thereto for rendering said circuit oscillating, means applying a potential to said device which varies as a linear function of time, means varying the cut-off potential of said device for rendering the latter conducting at any predetermined instant during application of said linearly varying potential, means limiting the extent of oscillations in said circuit whereby a negative and a positive impulse is produced thereby at each instance said device is rendered conducting, output means responsive to said positive impulse for producing a first output impulse, means responsive to said negative and said positive impulses for producing a second positive impulse after lapse of a predetermined time following generation of the first negative impulse, and means applying said second positive impluse to said output means for producing a second output impulse lagging said first output impulse by said predetermined period of time.

6. A double pulse generator comprising an oscillator circuit including a blocked electron discharge device, means rendering said device conducting when a potential corresponding to the cut-off potential of said device is applied thereto for rendering said circuit oscillating, means applying a potential to said device which varies as a linear function of time, means varying the cut-off potential of said device for rendering the latter conducting at any predetermined instant during application of said linearly varying potential, means limiting the extent of oscillations in said circuit whereby a negative and a positive impulse is produced thereby at each instance said device is rendered conducting, a second oscillator circuit, a second electron discharge device for controlling oscillation of said second circuit, means responsive to said negative and said positive pulses for rendering said second device conducting after lapse of a predetermined period of time, means limiting the oscillations in said second circuit whereby a negative and a positive impulse is produced thereby at each instance that second device is dered conducting, and output means responsive to the positive impulses generated by said first and said second oscillator circuits for producing a first and a second output pulse with one of said output pulses lagging the other output pulse by said predetermined period of time.

7. A double pulse generator comprising an oscillator circuit including a blocked electron discharge device, means rendering said device conducting when a potential corresponding to the cut-off potential of said device is applied thereto for rendering said circuit oscillating, means applying a potential to said device which varies as a linear function of time, means varying the cut-off potential of said device for rendering the latter conducting at any predetermined instant during application of said linearly varying potential, means limiting the extent of oscillations in said circuit whereby a negative and a positive impulse is produced thereby at each instant said device is rendered conducting, a second oscillator circuit, a second electron discharge device for controlling oscillation of said second circuit, means responsive to said negative and said positive pulses for rendering said second device conducting after lapse of a predetermined period of time, means limiting the oscillations in said second circuit whereby a negative and a positive impulse is produced thereby at each instance that second device is rendered conducting, and an electron discharge device for amplifying and rectifying the negative impulse outputs of said oscillator circuits whereby a pair of negative output pulses are produced with one of said pulses lagging the other by said predetermined period of time.

8. A double pulse generator comprising a pair of oscillator circuits, one of said circuits responsive to application of saw tooth wave forms for generating a pulsating output upon application of each saw tooth wave form thereto, means varying the time of generation of said pulsating output with respect to propagation of each saw tooth wave form, means responsive to the pulsating output of said one circuit for rendering the other circuit oscillating after lapse of a predetermined duration of time whereby a second pulsating output is generated, and means responsive to the pulsating outputs of said oscillator circuits for generating a double pulse separated by an interval corresponding to said predetermined duration of time.

MILLARD S. McVAY.
JOHN H. GREIG.

REFERENCES CITED

The following references are of record in the file of this patent:

UNITED STATES PATENTS

| Number | Name | Date |
|---|---|---|
| 1,733,614 | Marrison | Oct. 29, 1929 |
| 2,145,332 | Bedford | Jan. 31, 1939 |
| 2,154,484 | Bell | Apr. 18, 1939 |
| 2,185,635 | Kock | Jan. 2, 1940 |
| 2,226,706 | Cawein | Dec. 31, 1940 |
| 2,230,429 | Kock et al. | Feb. 4, 1941 |
| 2,230,926 | Bingley | Feb. 4, 1941 |
| 2,265,996 | Blumlein | Dec. 16, 1941 |
| 2,452,549 | Cleeton | Nov. 2, 1948 |
| 2,471,413 | Cleeton | May 31, 1949 |

FOREIGN PATENTS

| Number | Country | Date |
|---|---|---|
| 355,705 | Great Britain | Aug. 24, 1931 |